(12) United States Patent
Poehner

(10) Patent No.: US 10,279,665 B2
(45) Date of Patent: May 7, 2019

(54) LOCKING SEAL DEVICE

(71) Applicant: Marc K Poehner, Dupo, IL (US)

(72) Inventor: Marc K Poehner, Dupo, IL (US)

( * ) Notice: Subject to any disclaimer, the term of this patent is extended or adjusted under 35 U.S.C. 154(b) by 0 days.

(21) Appl. No.: 15/654,172

(22) Filed: Jul. 19, 2017

(65) Prior Publication Data

US 2017/0313169 A1    Nov. 2, 2017

(51) Int. Cl.
*E04H 15/64* (2006.01)
*B60J 7/06* (2006.01)
*B60R 5/04* (2006.01)
*E04H 15/32* (2006.01)
*B60J 11/02* (2006.01)

(52) U.S. Cl.
CPC .............. *B60J 7/068* (2013.01); *B60R 5/047* (2013.01); *B60R 5/048* (2013.01); *E04H 15/322* (2013.01); *E04H 15/642* (2013.01); *E04H 15/644* (2013.01); *B60J 11/02* (2013.01)

(58) Field of Classification Search
CPC ... E04H 15/322; E04H 15/644; E04H 15/642; B60J 7/068; B60J 11/02; B60R 5/048; B60R 5/047
USPC .............................................. 52/63, 64, 222
See application file for complete search history.

(56) References Cited

U.S. PATENT DOCUMENTS

| | | | | |
|---|---|---|---|---|
| 4,878,322 A * | 11/1989 | Ikeda | .................... | A01G 9/1415 52/2.18 |
| 4,926,605 A * | 5/1990 | Milliken | ................. | B63B 17/00 160/392 |
| D309,351 S * | 7/1990 | Patsy, Jr. | ...................... | D25/119 |
| 4,976,074 A * | 12/1990 | Delamare | ............... | E04H 15/20 52/2.23 |
| 5,076,033 A * | 12/1991 | Patsy, Jr. | ................. | E04H 15/58 160/392 |
| 5,125,713 A * | 6/1992 | Willingham | .............. | B60P 7/04 160/242 |
| 5,794,400 A * | 8/1998 | Fisher | ..................... | E04F 10/02 156/294 |
| 5,882,062 A * | 3/1999 | Chenowth | ................ | B60J 7/068 296/100.11 |
| 7,063,096 B2 * | 6/2006 | Stoeckler | ................ | E04H 15/46 135/114 |
| 7,343,956 B2 * | 3/2008 | Schleef | ................... | B60R 5/047 160/23.1 |
| 9,731,584 B2 * | 8/2017 | Hannan | .................... | B60J 7/068 |

(Continued)

FOREIGN PATENT DOCUMENTS

| | | | | |
|---|---|---|---|---|
| DE | 3025908 A1 * | 2/1982 | .......... | D06N 3/0063 |
| EP | -1422361 A2 * | 5/2004 | ............. | E04H 15/20 |

*Primary Examiner* — Adriana Figueroa
(74) *Attorney, Agent, or Firm* — Barry Choobin; Patent 360

(57) ABSTRACT

A locking device for a covering member to provide sealing in storage, cargo, and other personal applications is disclosed. The locking device comprises a pipe member having predetermined length is configured to have a transverse opening. The covering member is slidably attached to a bead insert positioned inside the pipe member via the transverse opening, wherein the covering member is configured to securely wrap the contents of a storage space. The locking device is configured to enable a climate controlled environment for the wrapped contents of the storage space. A locking assembly and method of using the same is also disclosed.

4 Claims, 23 Drawing Sheets

(56) References Cited

U.S. PATENT DOCUMENTS

| | | | | |
|---|---|---|---|---|
| 2006/0219373 A1* | 10/2006 | McKinney | ............ | E04H 15/642 160/395 |
| 2006/0219374 A1* | 10/2006 | McKinney | ............ | E04H 15/642 160/395 |
| 2013/0233365 A1* | 9/2013 | Loos | ............ | E04H 15/005 135/114 |
| 2016/0108638 A1* | 4/2016 | Loos | ............ | E04H 15/005 135/114 |
| 2016/0236553 A1* | 8/2016 | Stewart | ............ | B60J 7/068 |

* cited by examiner

LOCKING SEAL DEVICE

BACKGROUND OF THE INVENTION

A. Technical Field

The invention disclosed herein generally relates to a locking seal device in sealing and tightening applications. Specifically related to the locking seal device for a covering/encapsulating member in storage, cargo, and other personal applications.

B. Description of Related Art

The transportation of cargo and/or material is a universal activity in this modern society. Typically, the cargo is often transported to multiple destinations using storage boxes and containers. However, securing of cargo is always a significant task to safely transport all the goods and contents to the destination. This generally involves strapping or securing manually which are labor intensive and time consuming. However, some of the goods require adequate security to maintain confidentiality and to safeguard the contents from an external environment. Tarpaulin and canvas sheets are used to cover cargo space structures. Due to design, or improper usage, these tarpaulins get torn and the contents of the cargo are left exposed to external environment and inclement weather.

Storage of items is also another phenomenon which requires secured device or mechanism to encapsulate/cover the contents. Industrial and manufacturing assets, high-end equipment's machineries, boats, cars, vehicles, etc., parked outside without any protection will lead to their destruction. Therefore, proper covering must be provided for efficient storage and maintenance.

Locking seals are employed in such requirements to protect the contents of locked rail cars, trucks, and shipping containers. However, all are fastening devices used to provide bolt seals for securing the cargo. In certain applications, grommet design locking seals are used on tarpaulin covering to secure the contents of the cargo. Again, this leads to tearing away of the material around the grommet and eventually exposing the contents outside.

Current methods available for storage and transport of goods uses out-structures purchased and built on property, pod rental dropped on property and self-storage facilities. However, these incur additional cost in storage and maintenance and still have their own limitations in safely securing the contents of the storage space. There are many devices and methods to protect the contents of storage space. However, they are limited to use in certain size and configuration and could not be used for larger storage space or boxes. Some of the devices require skilled technician for assembly and disassembly which increases the cost and time. None of the devices protects the contents of the storage from water and dust completely and does not meet the required Ingress Protection.

Hence, there is a long felt but unresolved need for a locking device to seal a storage space using a covering/encapsulating member in storage, cargo, and other personal applications.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter. As used here the 'covering' refers to any type of encapsulating, sealing, or housing thereof.

A locking device for a covering member to provide sealing in storage, cargo, and other personal applications is disclosed. The locking device comprises a pipe member having predetermined length is configured to have a transverse opening. The covering member is slidably attached to a bead insert positioned inside the pipe member via the transverse opening, wherein the covering member is configured to securely wrap the contents of a storage space. The locking device is configured to enable a climate controlled environment for the wrapped contents of the storage space.

In an embodiment, the locking device could be used to seal at least one of a building structure, a storage container, barrier, a wall, an advertising banner, a wind block and a recreational vehicle wrap. In another embodiment, a locking assembly for the covering member to selectively apply the base layer and the covering member to wrap the contents of the storage space is disclosed.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION OF EMBODIMENTS

A description of embodiments of the present invention will now be given with reference to the Figures. It is expected that the present invention may be embodied in other specific forms without departing from its spirit or essential characteristics. The described embodiments are to be considered in all respects only as illustrative and not restrictive.

Figure 1A:
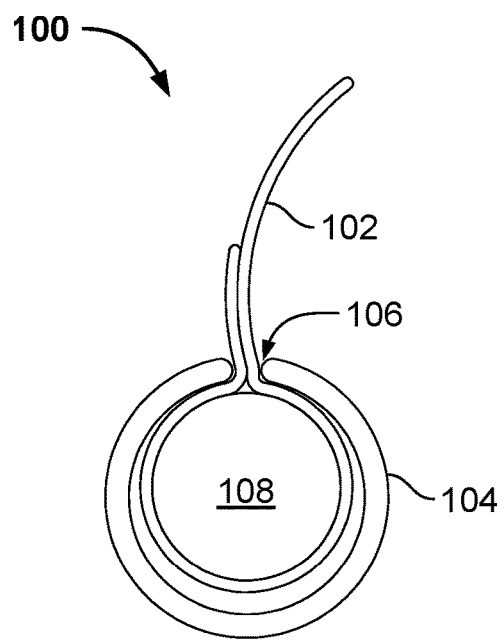
FIG. 1A exemplarily illustrates a front view of a locking device wherein a single bead insert with a covering member is attached to a pipe member.
Figure 1B:
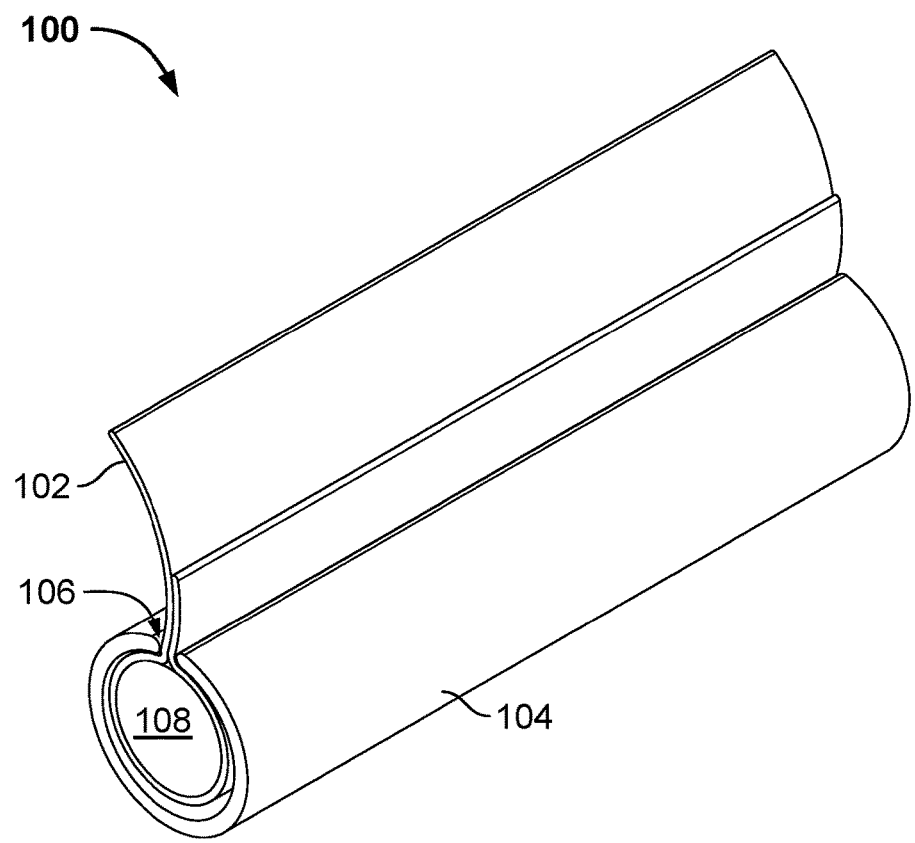
FIG. 1B exemplarily illustrates a side perspective view of a locking device wherein a single bead insert with a covering member is attached to a pipe member.

FIG. 1A exemplarily illustrates a front perspective view of a locking device 100 for a covering member 102. The locking device 100 for the covering member 102 to provide sealing in storage, cargo, and other personal applications comprises a pipe member 104 having predetermined length is configured to have a transverse opening 106. The covering member 102 is slidably attached to a bead insert 108 positioned inside the pipe member 104 via the transverse opening, wherein the covering member 102 is configured to securely wrap the contents 110 of a storage space as shown in FIG. 1B. Various configurations of the locking device 100, according to the present invention is adaptably used in a plurality of application areas such as storing contents 110 in the storage space, covering and tightening the cargo and a storage container, a barrier, a banner, a partition, a wind block, a wall, a back yard, a garage, or a parking lot, a multi-shaped room, a pass-thru, a booth, a tent, a temporary office, a pie-shaped room, a garage, a backyard, a swimming pool and so on.

Figure 2A:
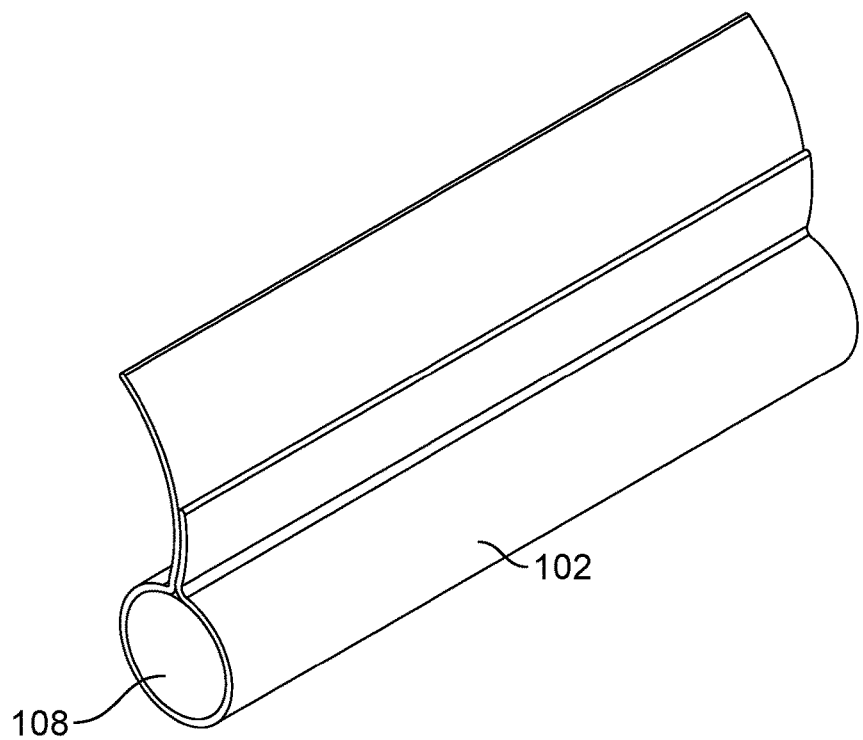
FIG. 2A exemplarily illustrates the side perspective view of the bead insert of the locking device.
Figure 2B:
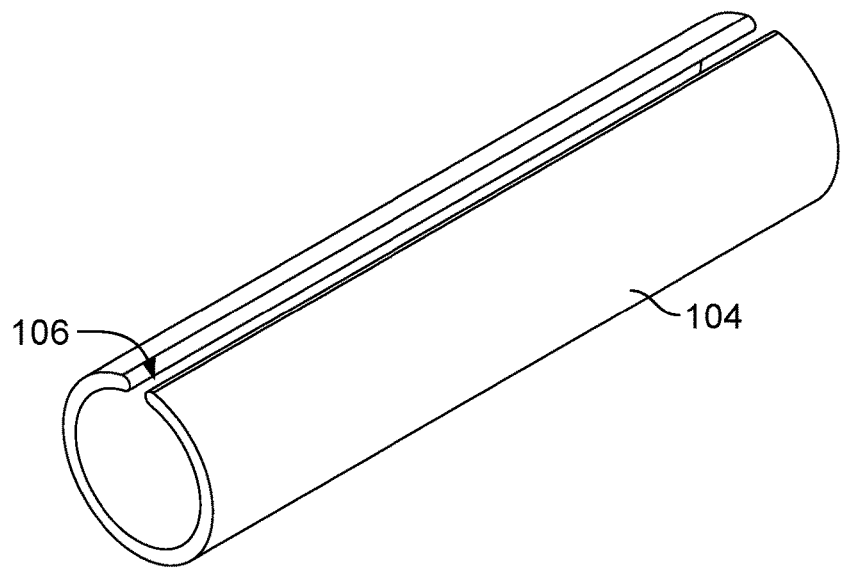
FIG. 2B exemplarily illustrates the side perspective view of the pipe member of the locking device.

In preferred embodiments, FIG. 2A exemplarily illustrates a front perspective view of the bead insert 108 used in the locking device 100. The bead inserts 108 is configured to be at least one of a cable, a cord, a rope, pipe, and a rod. The cable could be made of stainless steel for slide lock security. If used as the rope, materials such as nylon, fiber, braded cord, braded steel wire could be used. In addition, PVC, ABS, rubber, aluminum and stainless steel could also be used. FIG. 2B exemplarily illustrates the front perspective view of the pipe member 104 used in the locking device 100. The pipe member 104 is an outer frame configured to receive and hold the bead inserts 108 to allow the covering member 102 to tighten the space to be wrapped. The pipe member 104 is made from a plastic and preferably a PVC or a composite plastic material for corrosion and chemical resistance. In a different embodiment, slotted and extruded aluminum, stainless-steel could be used for higher strength.

Figure 3:
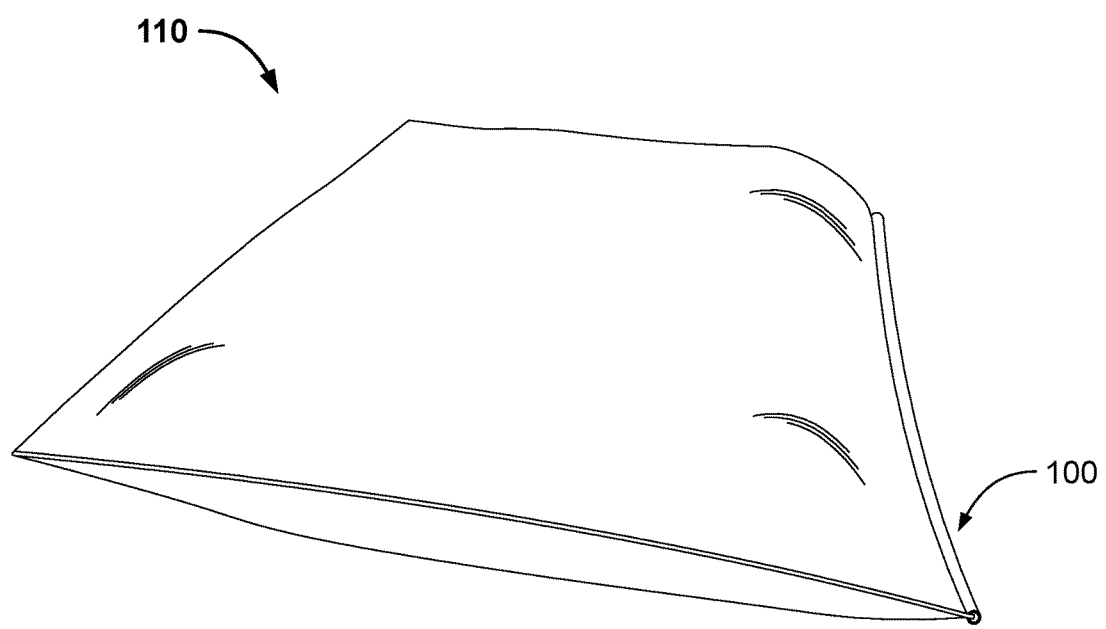
FIG. 3 exemplarily illustrates the storage contents secured by the locking device, incorporating the aspects of the present invention.

FIG. 3 shows a storage bag with contents 110 secured by the locking device 100. The covering member 102 which is a tarpaulin or any canvas cover is configured to cover widely to isolate the contents 110 from the surrounding ambient environment. This eliminates the need for out-structures, self-storage facilities, specialized box trucks and cargo trailers. Further, the sealing of the locking device 100 allows for dust-proof and water-proof environment for the contents 110 of the storage space. In a different embodiment, the locking device 100 is configured to enable a climate controlled environment for the wrapped contents 110 of the storage space. The storage bag with the locking device 100 is pressurized internally with dehumidified and filtered air which helps to maintain low positive pressure to prevent any undesirable elements from entering the storage space.

Figure 4A:
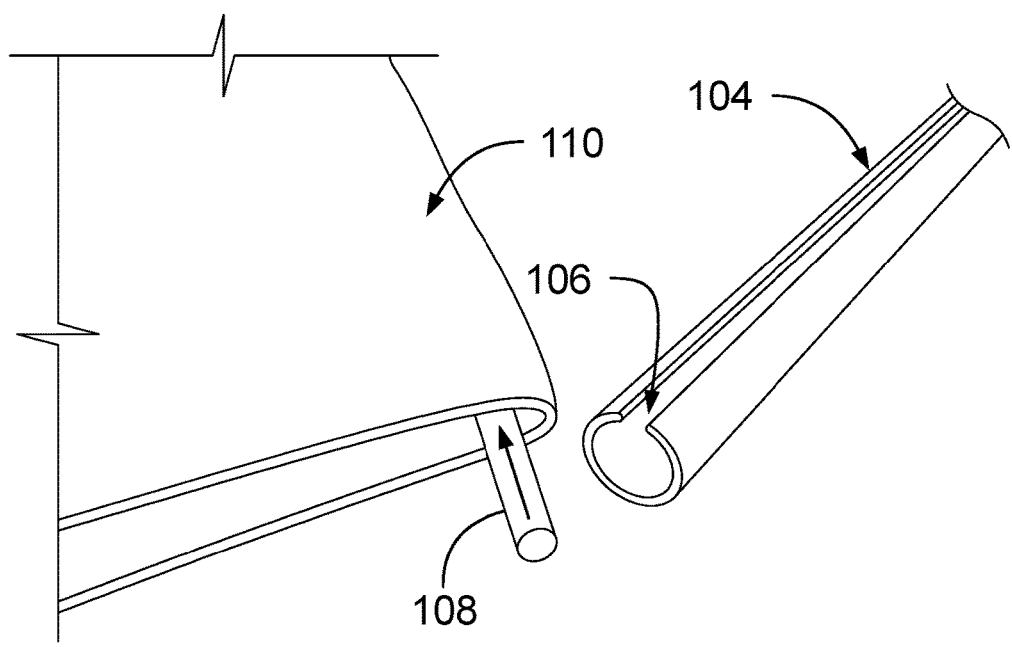
FIG. 4A exemplarily illustrates a method of sliding the locking device to seal the storage space, incorporating the aspects of the present invention.
Figure 4B:
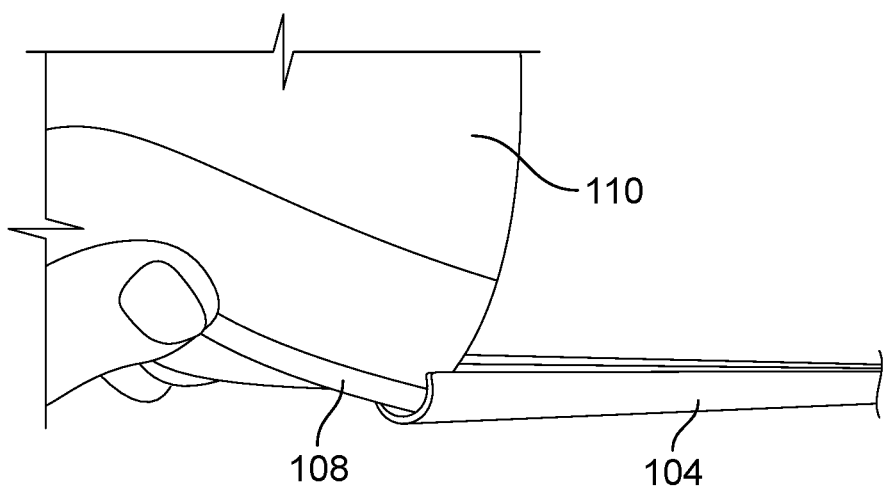
FIG. 4B exemplarily illustrates a method of sliding the locking device to seal the storage space, incorporating the aspects of the present invention.
Figure 4C:
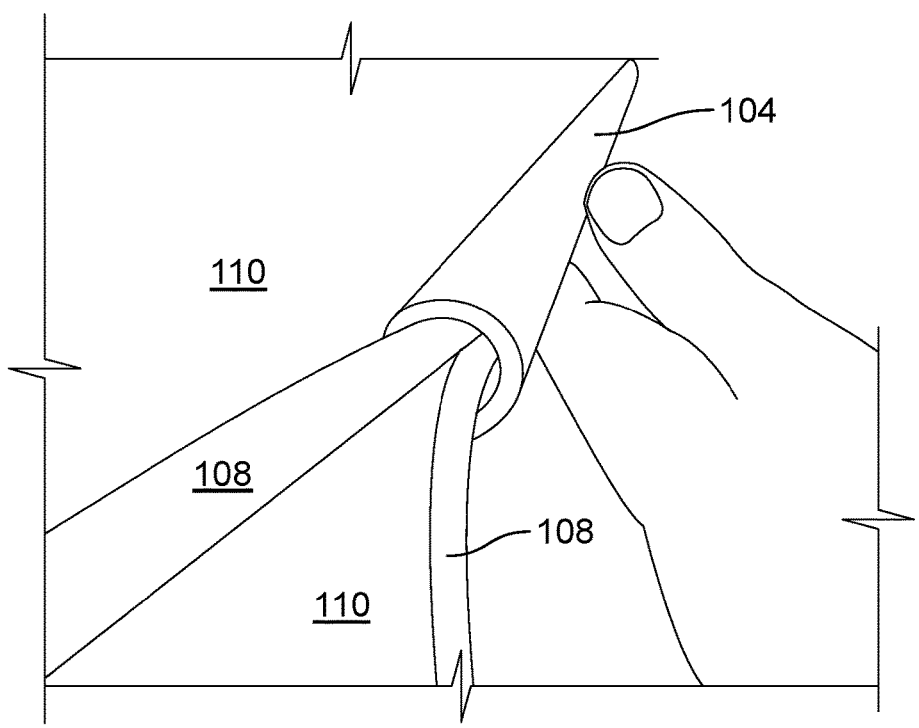
FIG. 4C exemplarily illustrates a method of using the locking device with a pair of bead inserts to seal the storage space, incorporating the aspects of the present invention.

In an embodiment, a method of using the locking device 100 for the covering member 102 is illustrated in FIG. 4A. The method comprises the step of sliding the pipe member 104 onto the edges of the bead inserts 108 with the covering member 102 and pushing it selectively based on the size requirements for the storage space as shown in FIG. 4B. In some embodiments, the bead inserts 108 may be wrapped prior or inserted after, in order to lock contents 110 into the pipe member 104. Depending on the additional requirements of the application, the pipe member 104 could be slid over a pair of bead inserts 108 as shown in FIG. 4C to have a bi-directional tightening and covering mechanism for improved strength and to provide safer environment for the contents 110 of the storage space. The locking device 100 is configured to support and wrap different types of equipment, machinery, boats, cars, that are parked in outdoor environments in a secured fashion.

Figure 5A:
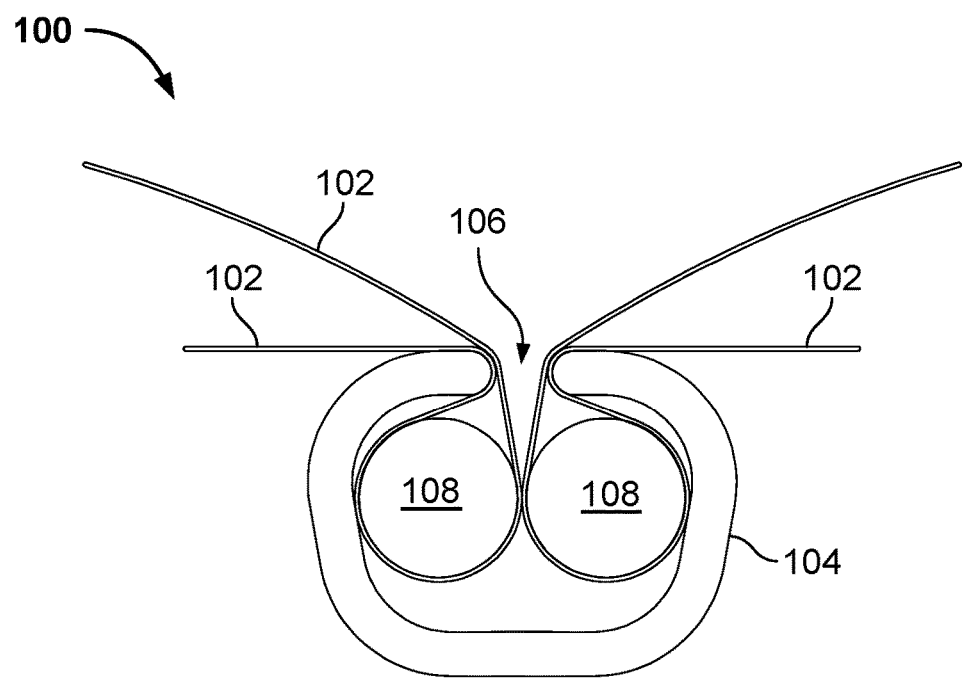
FIG. 5A illustrates the front view of a bi-directional locking device having dual bead inserts, incorporating the aspects of the present invention.
Figure 5B:
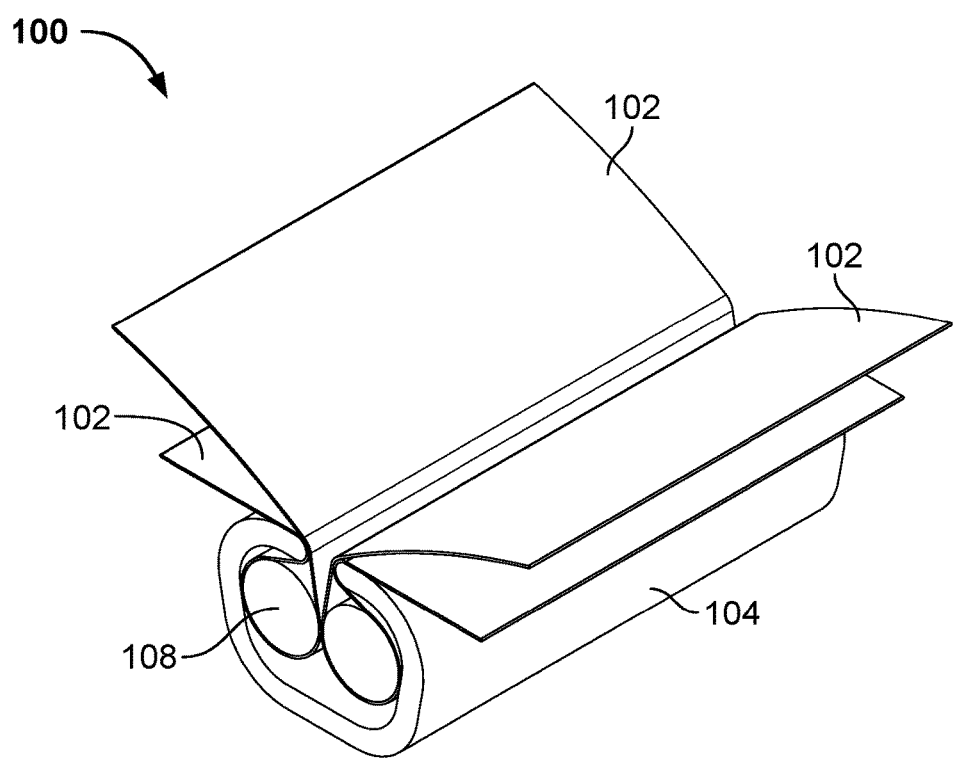
FIG. 5B illustrates the side perspective view of the bi-directional locking device having dual bead inserts, incorporating the aspects of the present invention.

In another embodiment, the locking device 100 is configured as a bi-directional slip-lock device, as shown in FIG. 5A which illustrates the bi-directional locking device 100 having dual bead inserts 108, according to the present invention. This is a slip-lock configuration wherein two bead inserts 108 are attached to the pipe member 104 to provide bi-directional tightening of the covering members 102. This is a self-locking seal where the two ends of the covering member 102 could be selectively pulled to tighten in both the directions released to lock to secure the contents 110 of the storage space as shown in FIG. 5B. This bi-directional locking device 100 could be used in applications such as cargo on a trailer or a truck, wind block, walls, recreational vehicle wrap and in stretching printed banners.

Figure 6A:
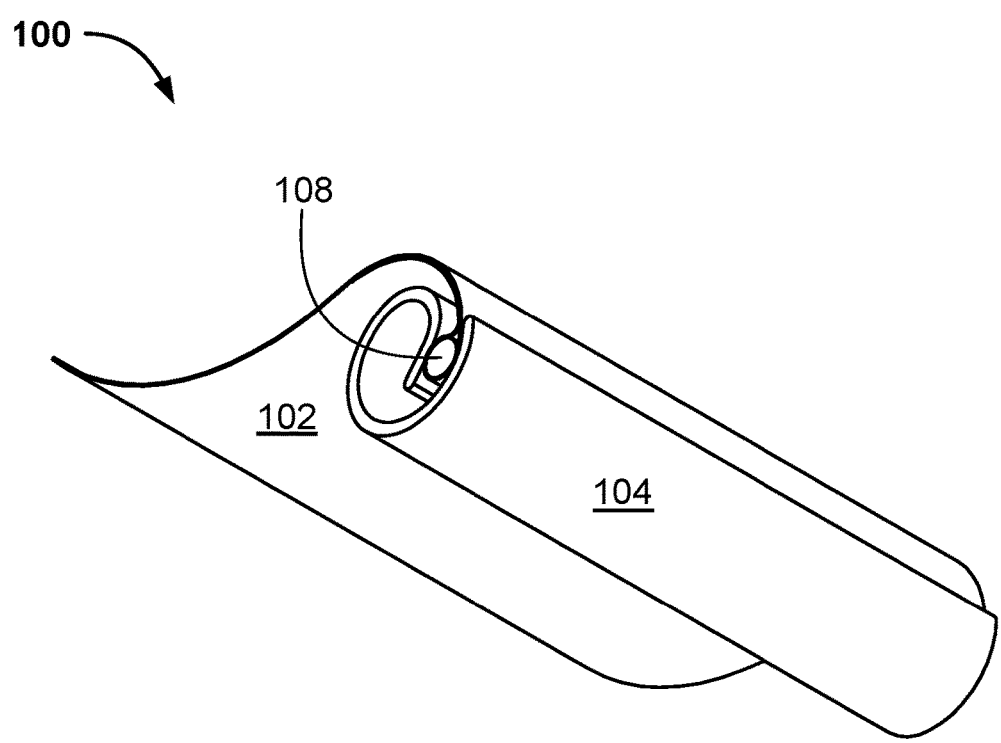
FIG. 6A illustrates a self-locking mechanism of the locking device, incorporating the aspects of the present invention.
Figure 6B:
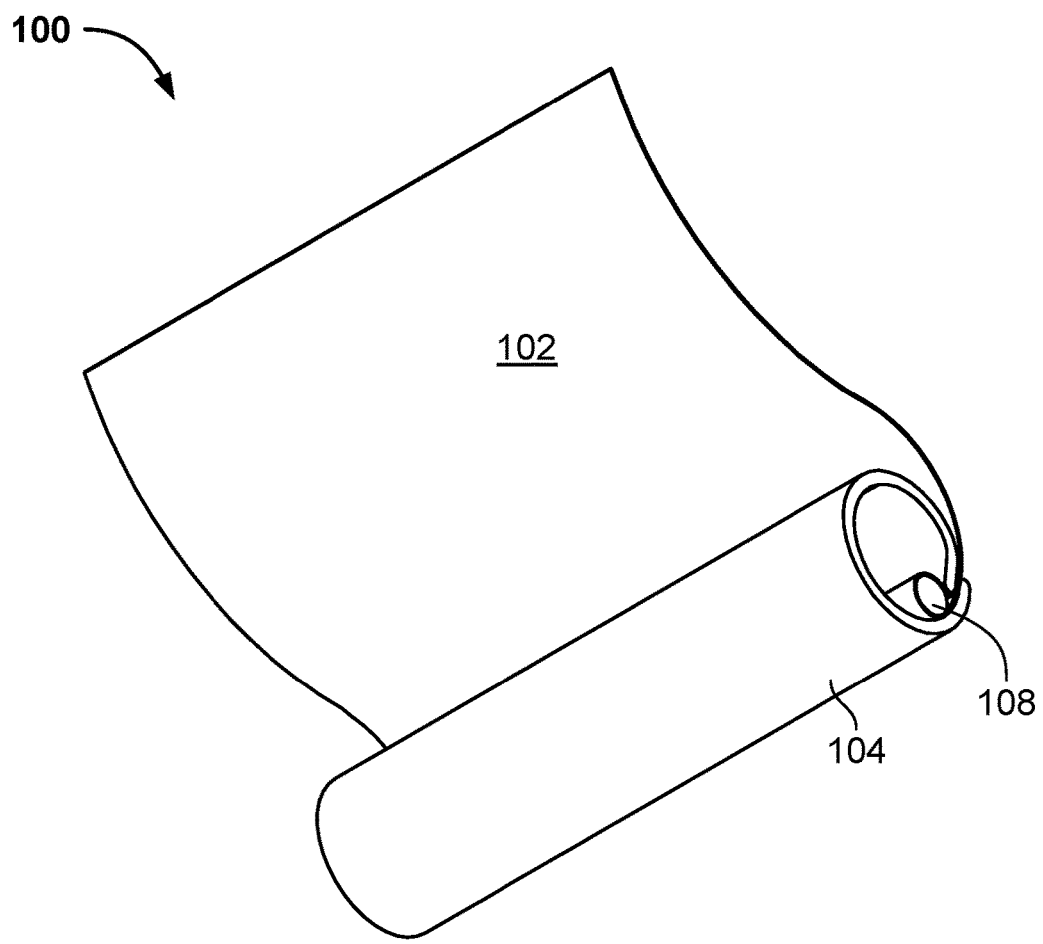
FIG. 6B illustrates an unlocking mechanism of the locking device, incorporating the aspects of the present invention.

As shown in FIG. 6A, a self-locking mechanism using the locking device 100 is disclosed. The pipe member 104 is made flexible such that when it acts as a self-locking door when the bead inserts 108 are pushed through to quickly lock the device 100 in tight quartered areas with limited space around the covering member 102. A rubber hinge is provided to allow this self-locking mechanism to easily lock the device 100. Similarly, for unlocking, the device 100 itself orients until the door locks behind the bead insert 108 for various tightening applications as shown in FIG. 6B.

Figure 7A:
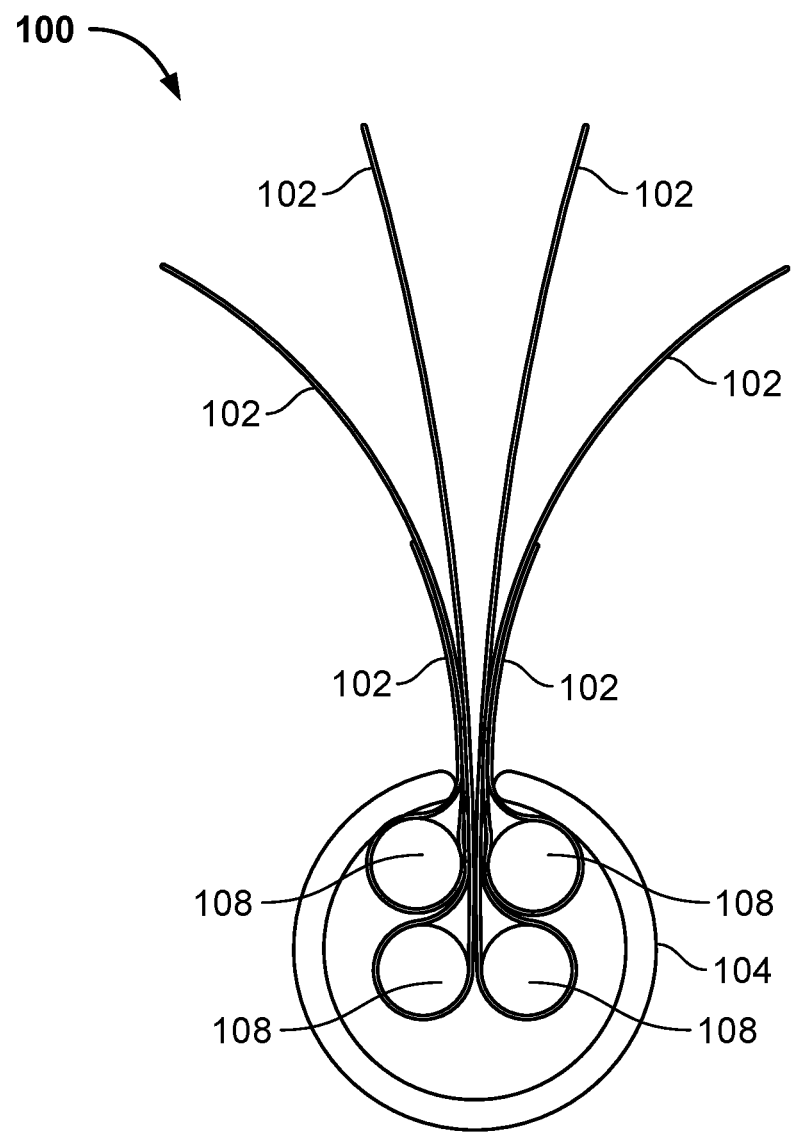
FIG. 7A illustrates the front view of the locking device having multiple bead inserts, incorporating the aspects of the present invention.

A building structure comprises the locking device 100 with the covering member 102 wherein a plurality of bead inserts 108 positioned inside the pipe member 104 as shown in FIG. 7A is configured to provide one or more covering members 102 to selectively expand and secure the building structure. Preferably, four bead inserts 108 could be used to provide expansion of the covering members 102. The building structure herein refers to at least one of multi-shaped rooms, booths, tents, temporary office structures, cubical walls and a pass-through. This multi-bead locking device 100 is configured to provide one or more covering members 102 to allow expanding in any direction to widely secure the contents 110 depending on the sizing of the environment.

Figure 7B:
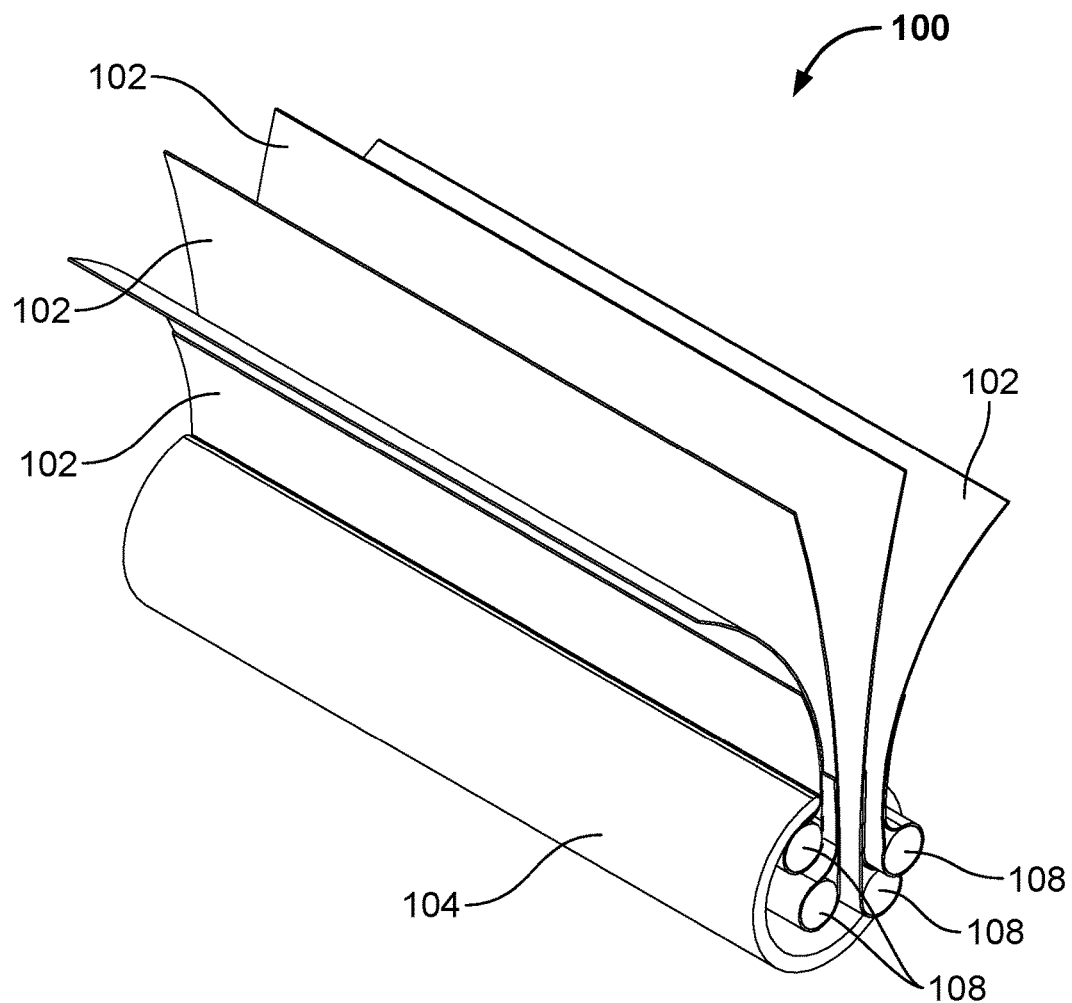
FIG. 7B illustrates the side perspective view of the locking device having multiple bead inserts, incorporating the aspects of the present invention.

As shown in FIG. 7B, the multi-bead locking device 100 could be used for barriers and partitions to maintain exceptional strength and sheltered separation from ambient surroundings. This multi-bead locking device 100 could be used specifically for side-by-side or/and back-to-back, comparable with booths at a flea-market, attached temporary offices at a trade-show, or a round field-operations environment with contiguous pie shaped rooms. This provides infinite expansion of covering members 102 for existing storage environments such as back yards, garages, and parking lots.

Figure 8A:
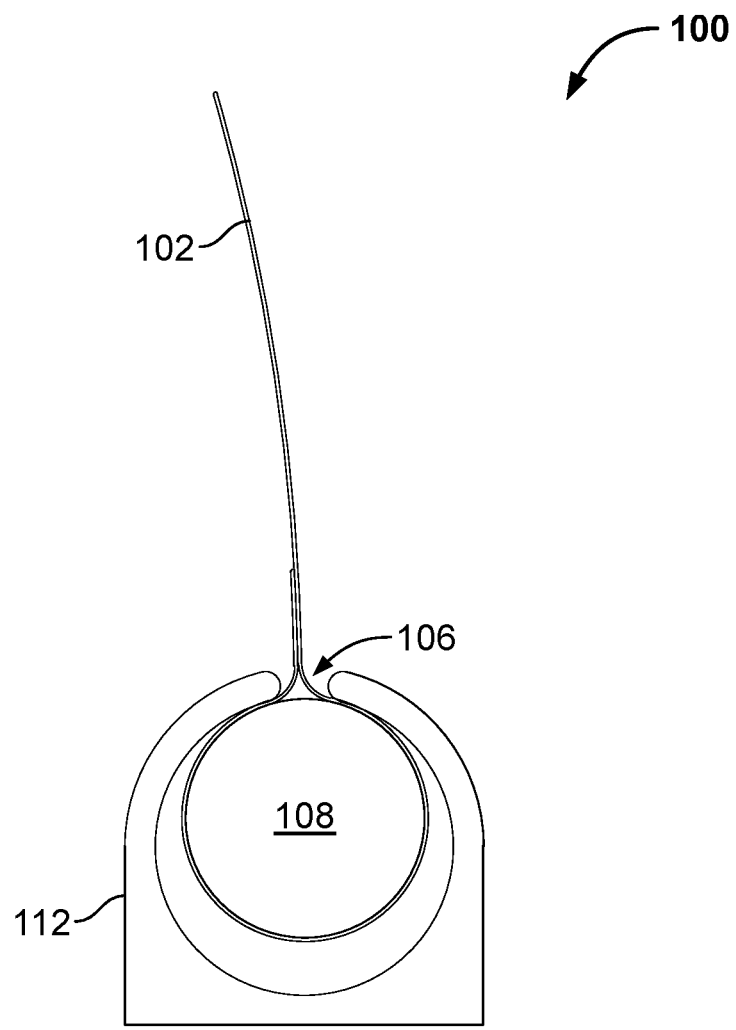
FIG. 8A illustrates the front view of a permanent mountable locking device, incorporating the aspects of the present invention.
Figure 8B:
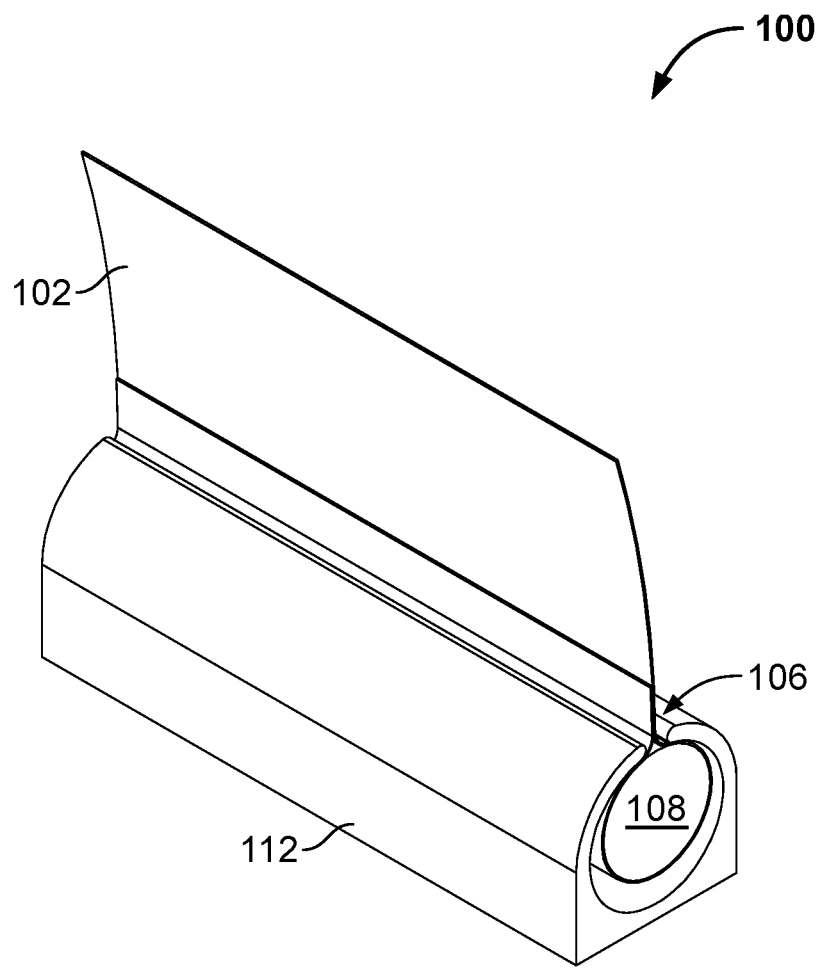
FIG. 8B illustrates the side perspective view of a permanent mountable locking device, incorporating the aspects of the present invention.

In one embodiment, the locking device 100 is configured as a permanent mountable locking device for sealing, as shown in FIG. 8A. The permanent mountable locking device 100 comprises a base member 112 of predetermined length configured to define a circular channel with a transverse opening 106. Bead inserts 108 are fixedly attached to the circular channel of the base member 112, wherein the covering member 102 slidably attached to the bead insert 108 is configured to securely wrap the contents 110 of the storage space. This permanent mountable locking device 100 provides high-strength sealing when mounted on trucks, trailers, base decks, poles, walls, and wind breaks. The base member 112 as shown in FIG. 8B could be fastened to the surface of the application area using bolts or screws. In an embodiment, a storage bag wherein the bead inserts 108 are permanently welded to the circular channel to provide high-strength sealing for the contents 110 of the bag.

Figure 9A:
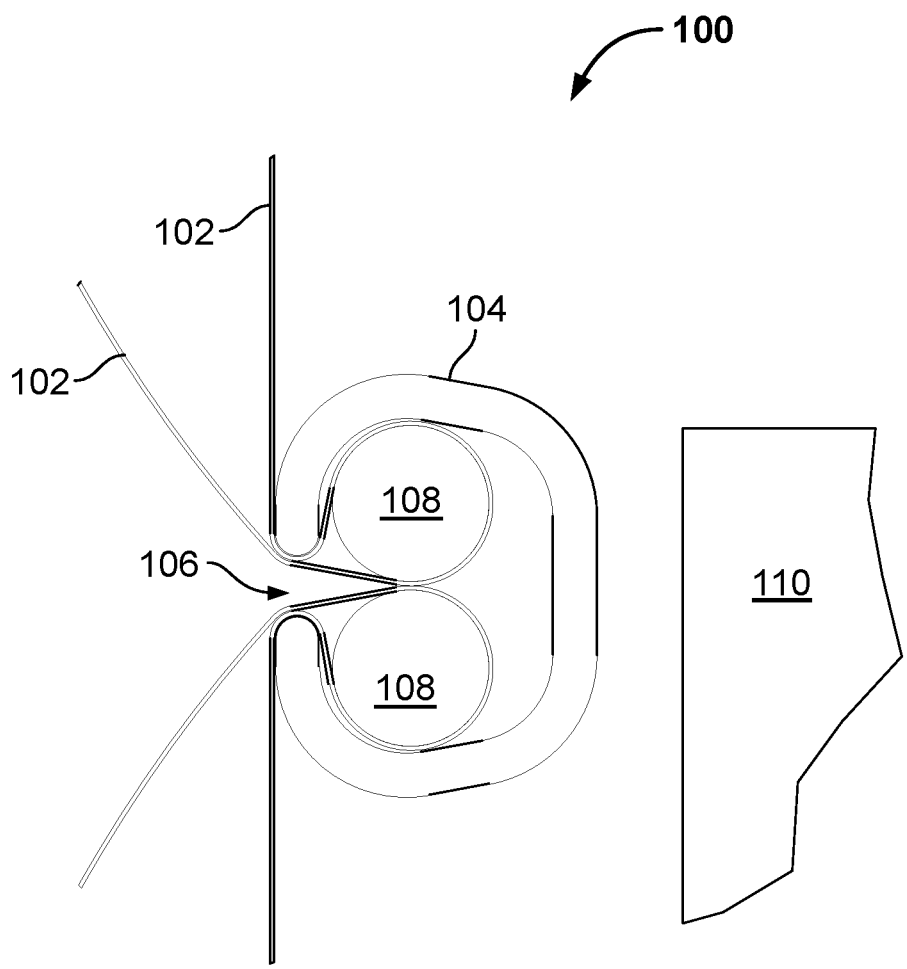
FIG. 9A illustrates the front view of a bi-directional draw down locking device, incorporating the aspects of the present invention.
Figure 9B:
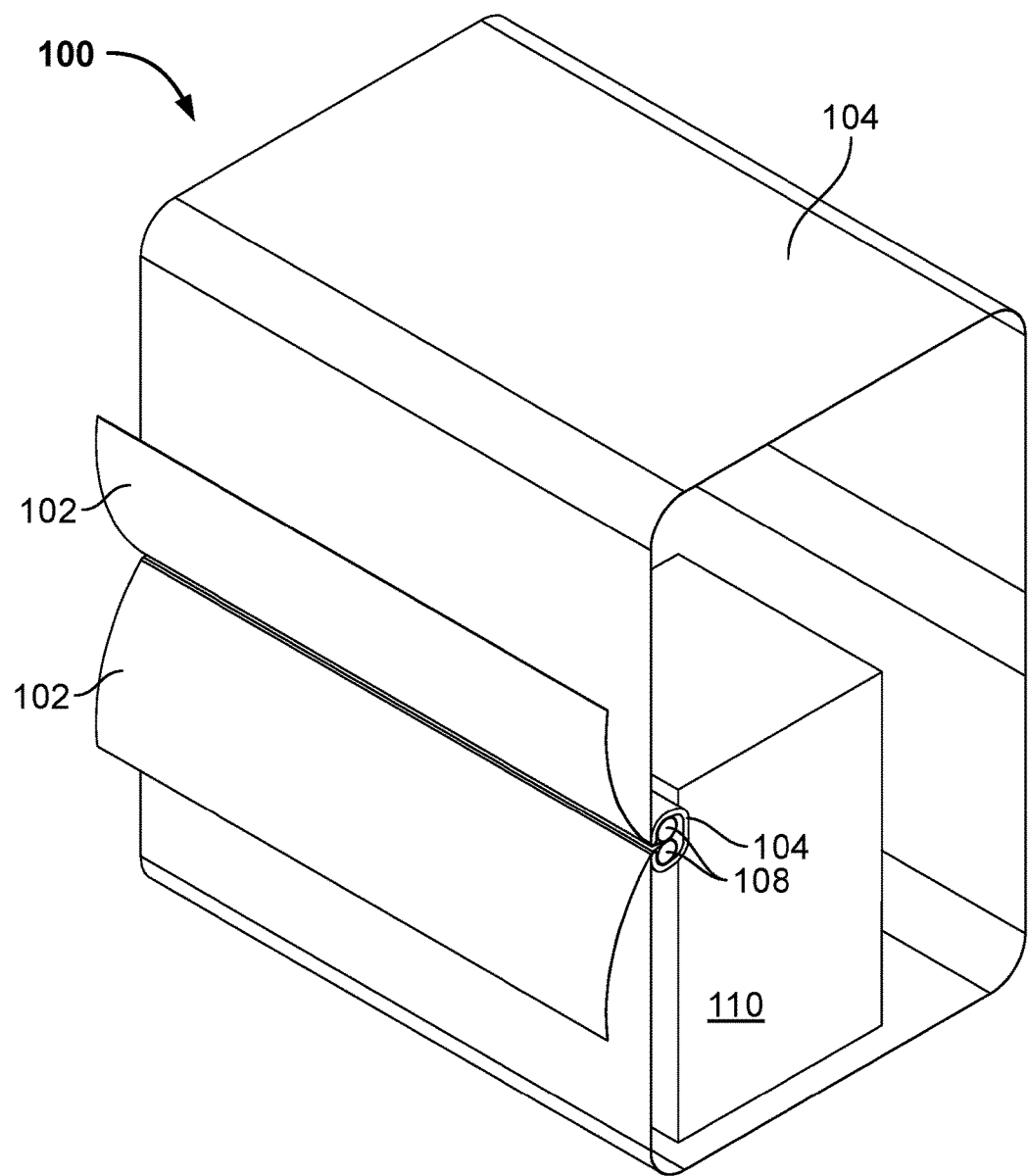
FIG. 9B illustrates the side perspective view of the bi-directional draw down locking device, incorporating the aspects of the present invention.

In a different embodiment, the locking device 100 is configured as a bi-directional draw-down locking device, as shown in FIG. 9A. In industrial applications, the locking device 100 allows for bi-directional tightening of the covering member 102 to expand and secure the contents 110 of the storage container. The user could be able to pull either one or both the covering members 102 to provide instant flexible sizing with self-locking mechanism to seal the storage container as shown in FIG. 9B. The bi-directional draw-down locking device 100 could be used in cargo on trailers or trucks, wind blocks, walls, storage containers, recreational vehicle wrap, and tightening in advertising banners.

Figure 10A:
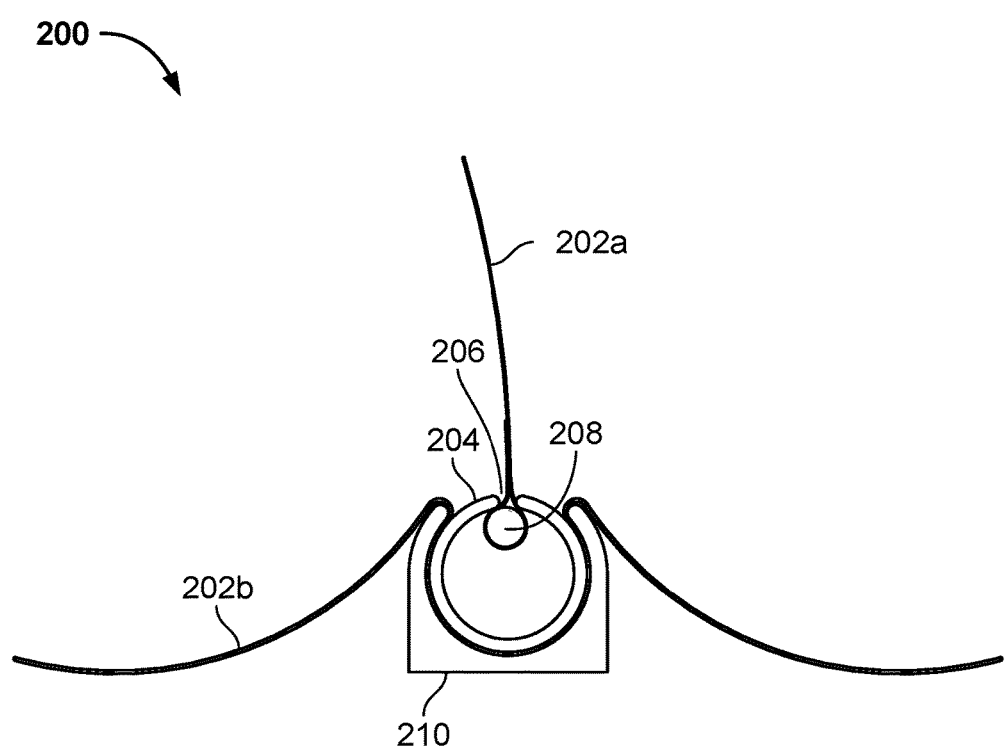
FIG. 10A illustrates the front view of a modular locking device mounted on a base member.
Figure 10B:
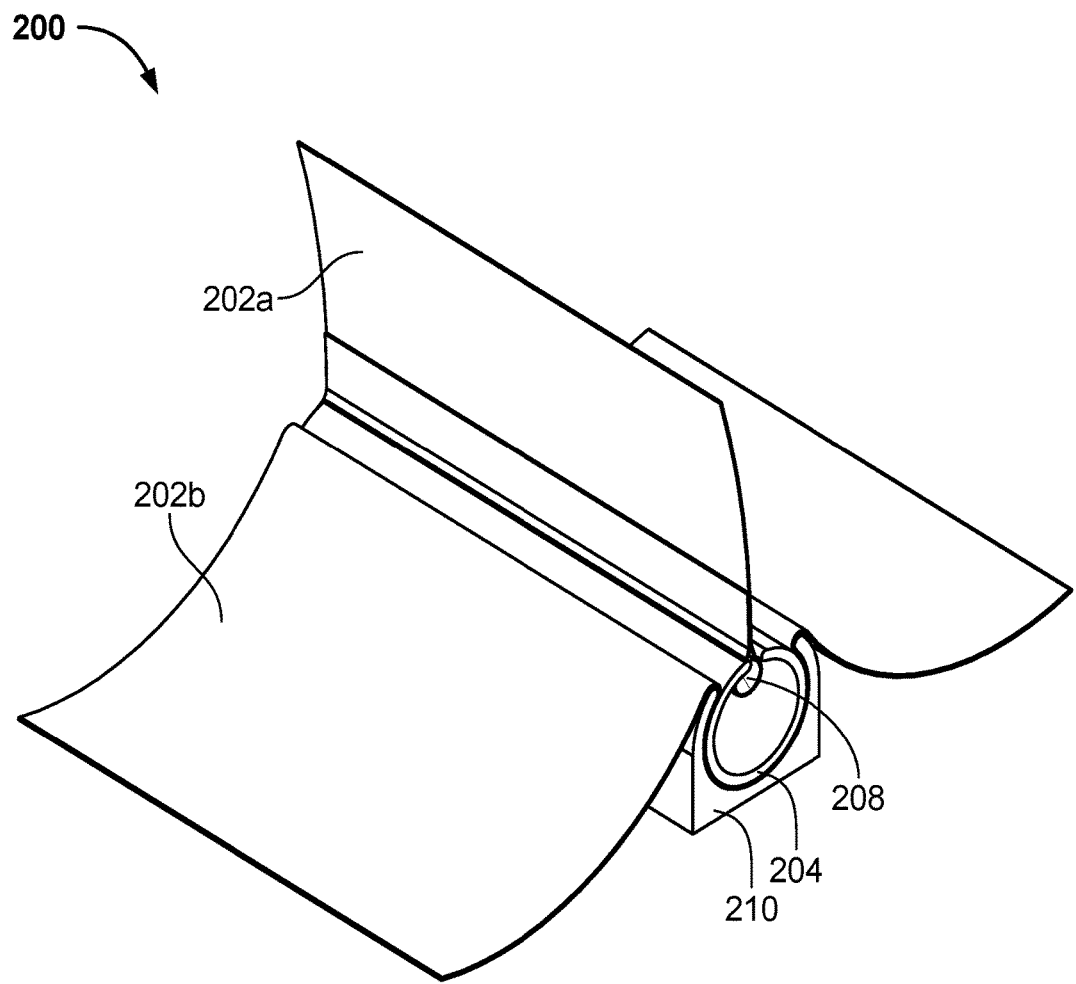
FIG. 10B illustrates the side perspective view of the modular locking device mounted on a base member.

In an alternate embodiment, FIG. 10A illustrates the front view of locking assembly 200 with snap in modular base, according to the present invention. The locking assembly 200 comprises a base member 210 of predetermined length is configured to define a circular channel with a transverse opening 206, wherein a base layer 202b is sealed to an inner surface of the circular channel via the transverse opening 206. A pipe member 204 is removably attached to the circular channel of the base member 210, wherein bead inserts 208 with a covering member 202a positioned inside the pipe member 204 as shown in FIG. 10B to selectively apply the base layer 202b and the covering member 202a to wrap the contents 110 of the storage space.

Figure 10C:
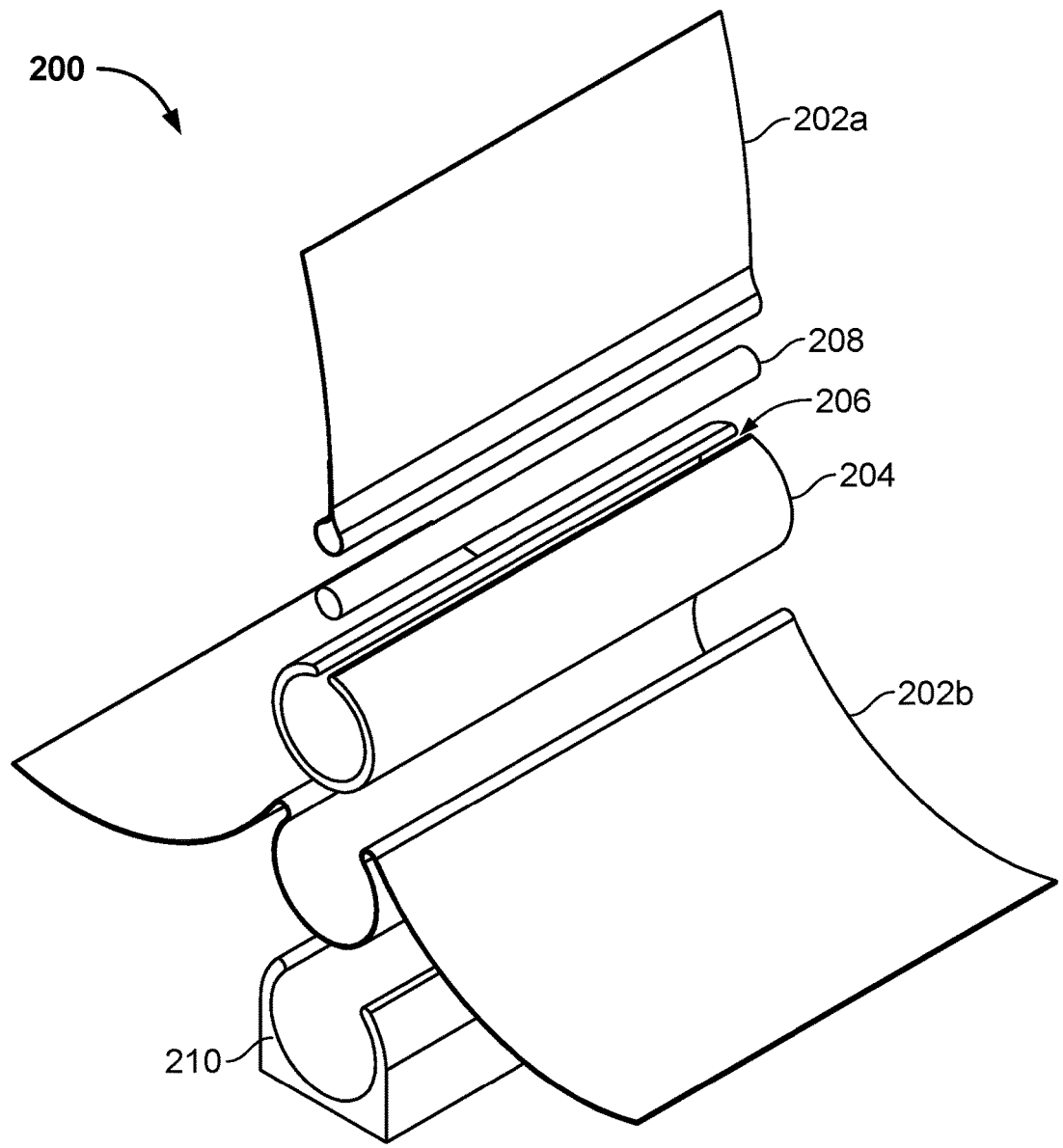
FIG. 10C illustrates an exploded view of the modular locking device, incorporating the aspects of the present invention.

The base member 210 is made from at least one of an acrylonitrile-butadiene-styrene, a rubber, a nylon and a PVC material. The base member 210 could be mounted on the structure such as trucks, trailers, base decks, poles, walls, and wind breaks to use the locking assembly 200 as a modular unit to selectively seal the structure. The bead inserts 208 is as shown in FIG. 10C are coated to provide flexibility in locking the assembly 200. The combination of the base layer 202b and the covering member 202a provides convenience for the user to join and seal the locking assembly 200 for the target application.

Figure 11A:
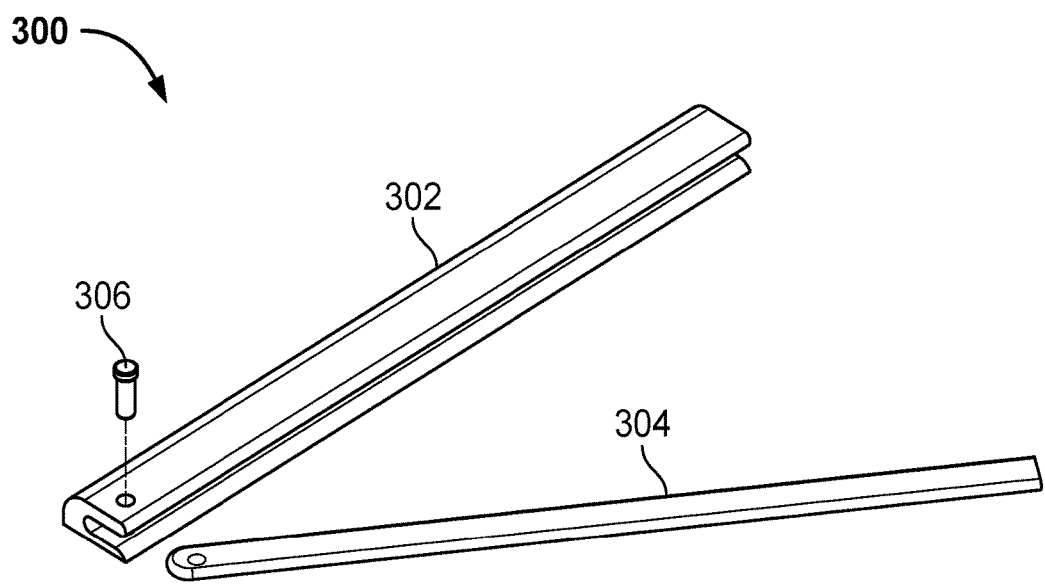
FIG. 11A illustrates an exploded view of the tongue and groove clamp locking device, incorporating the aspects of the present invention.
Figure 11B:
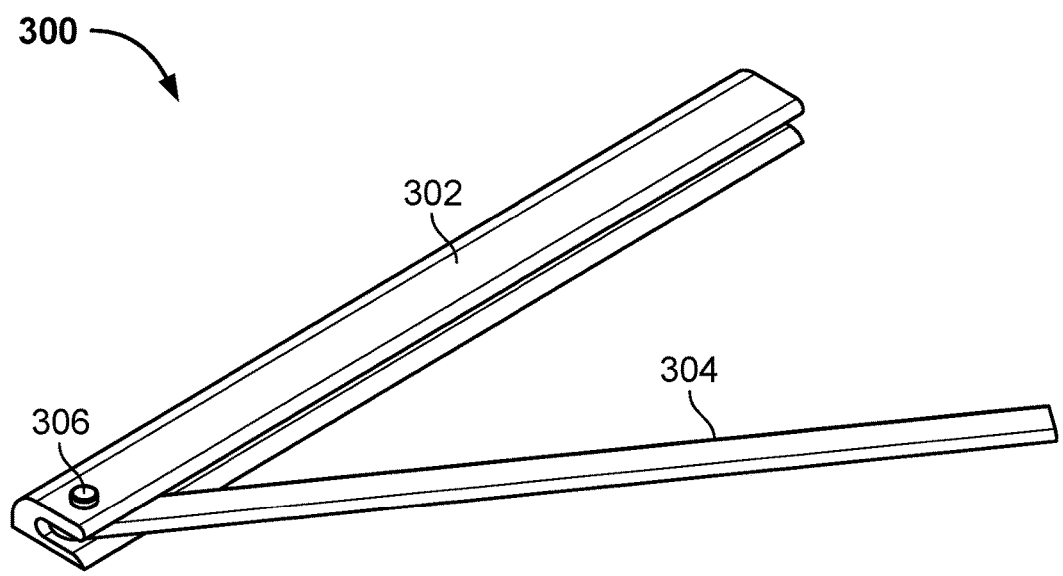
FIG. 11B illustrates the perspective view of the tongue and groove clamp locking device, incorporating the aspects of the present invention.
Figure 11C:
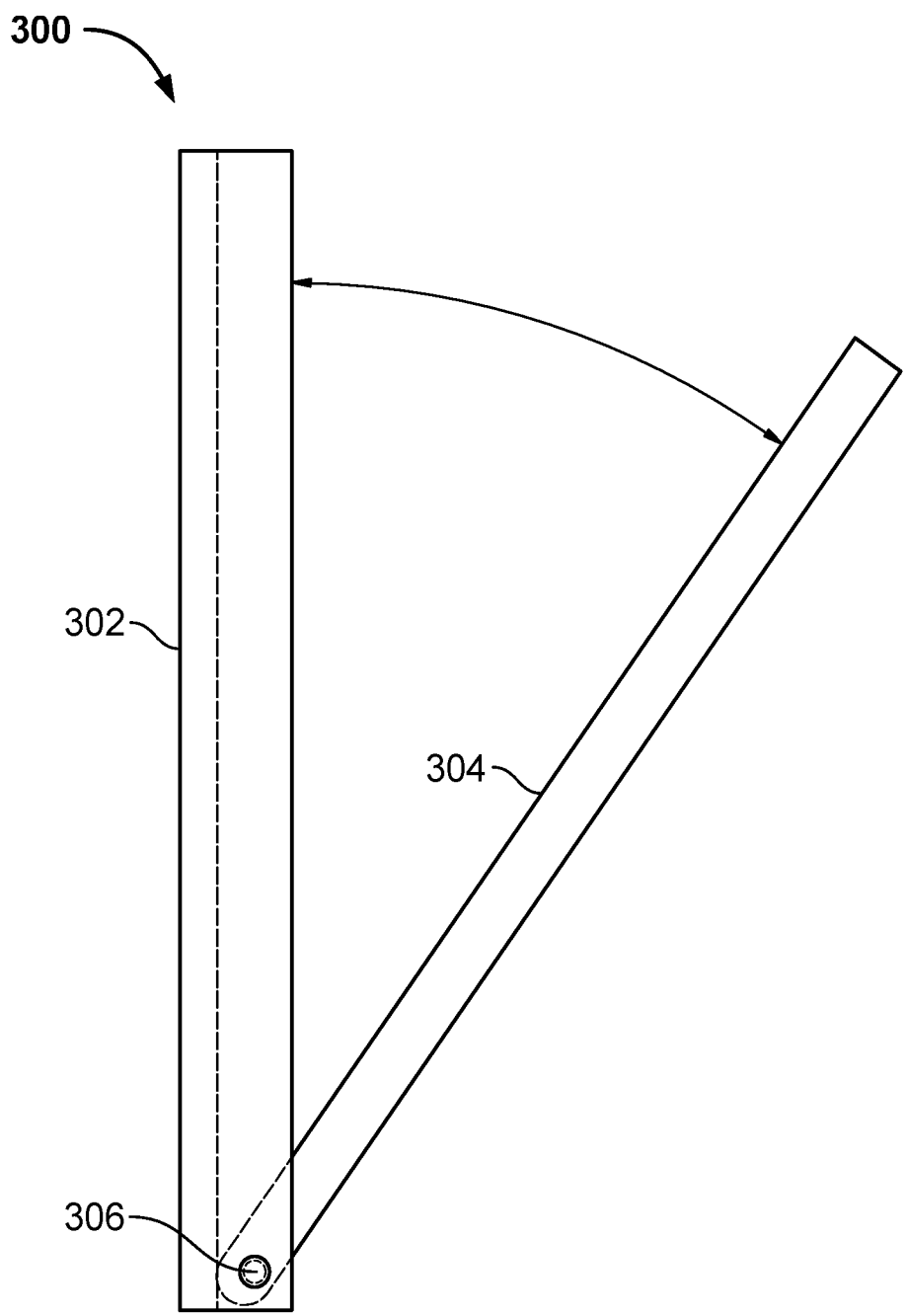
FIG. 11C illustrates the top view of the tongue and groove clamp locking device, incorporating the aspects of the present invention.

In an alternate embodiment, FIG. 11A illustrates the exploded view of tongue and groove base clamp locking device 300, according to the present invention. The locking device 300 comprises a groove base 302 and a bead insert 304 joined or clamped each other at an end by a clamping device 306. In some embodiments, the clamping device 306 could be a screw. FIG. 11B and FIG. 11C illustrates the perspective view and top view of the locking device 300 with secure tongue and groove base clamp. The bead insert 304 is configured to provide self-locking seal to securely wrap the contents of the storage container. A covering member, for example, tarpaulin or canvas member, could be laid over base 302 and clamping device 306. The locking device 300 is configured to allow bi-directional tightening of the covering members to selectively expand and secure the contents of the storage container. Further, the locking device 300 is surface mountable on any vehicles such as pick-up truck, bed frame of trailer, and floor surface, ceiling and wall. The locking device 300 could be configured to adapt on any size, for example, small to industrial large size.

The locking device 100, according to the present invention, provides high strength sealing for the storage contents 110 in any external environment as well as cargo containers used on trucks and trailers. The device 100 also helps in tightening applications in walls, banners, poles, wind block and so on. The device 100 eliminates the need for specialized self-storage structures by providing a secure and climate control environment for the contents 110 of the storage. The locking device 100 could be used to provide sealed environments for storage, cargo and personal applications. It is impervious to water and dust and infinitely sizeable by having enough flexibility in expanding the covering members 102 using variety of configurations of the device 100. The device 100 is cost-effective and allows for easy and quick assembly/disassembly of the components. The device 100 eliminates the possibility of grommet tearing failure and magnifies the overall strength by isolating the contents 110 from the surrounding ambient environment.

The foregoing examples have been provided merely for the purpose of explanation and are in no way to be construed as limiting of the present concept disclosed herein. While the concept has been described with reference to various embodiments, it is understood that the words, which have been used herein, are words of description and illustration, rather than words of limitation. Further, although the concept has been described herein with reference to particular means, materials, and embodiments, the concept is not intended to be limited to the particulars disclosed herein; rather, the concept extends to all functionally equivalent structures, methods and uses, such as are within the scope of the appended claims. Those skilled in the art, having the benefit of the teachings of this specification, may affect numerous modifications thereto and changes may be made without departing from the scope and spirit of the concept in its aspects.

The invention claimed is:

1. A locking assembly with snap in modular base for a covering member used in at least one of a barrier, a wall, an advertising banner, a wind block, and a recreational vehicle wrap, comprising, a base member mounted on the structure including a truck, a trailer, a base deck, a pole, a wall, and a wind break, of predetermined length is configured to define a circular channel with a transverse opening, a base layer is sealed to an inner surface of the circular channel via the transverse opening, a pipe member is removably attached to the circular channel of the base member, wherein the base layer is positioned between the circular channel and the pipe member; and a bead insert, wherein the bead insert with the covering member is positioned inside the pipe member to selectively apply the base layer and the covering member to wrap the contents of a storage space, wherein the combination of the base layer and the covering member provides convenience for the user to join and seal the locking assembly for a target application.

2. The locking assembly for the covering member of claim 1, wherein the pipe member is made from a plastic material.

3. The locking assembly for the covering member of claim 1, wherein the pipe member is made from a PVC or a composite plastic material.

4. The locking assembly for the covering member of claim 1, wherein the base member is made from at least one of an acrylonitrile-Butadiene-Styrene, a rubber, a nylon and a PVC material.

* * * * *